F. H. RICHARDS.
FASTENING DEVICE.
APPLICATION FILED NOV. 23, 1900.
927,167.
Patented July 6, 1909.
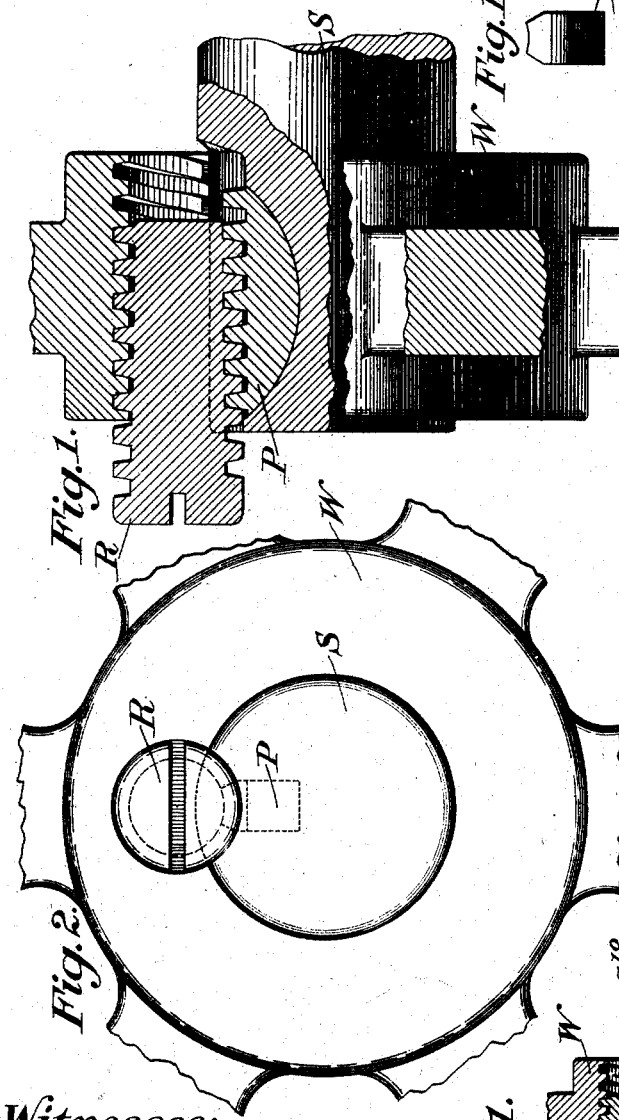
Witnesses:
Inventor:
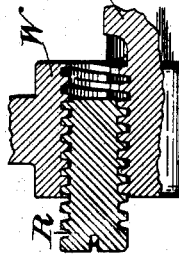

UNITED STATES PATENT OFFICE.

FRANCIS H. RICHARDS, OF HARTFORD, CONNECTICUT.

FASTENING DEVICE.

No. 927,167.  Specification of Letters Patent.  Patented July 6, 1909.

Application filed November 23, 1900. Serial No. 37,420.

*To all whom it may concern:*

Be it known that I, FRANCIS H. RICHARDS, a citizen of the United States, residing at Hartford, in the county of Hartford and State of Connecticut, have invented certain new and useful Improvements in Fastening Devices, of which the following is a specification.

This invention relates to devices for securing machine or kindred parts fixedly together, and is especially directed toward the furnishing of a fastening device for use in assembling shafts and parts carried thereon in machines where precision in the relative positions of the secured parts is desired.

It is a further object of the invention to provide a fastening device adapted to be made in very small sizes and with a high degree of precision, and also, at a low cost of manufacture.

In the drawing accompanying and forming a part of this specification, Figure 1 illustrates the invention as applied to the securing of a wheel to a shaft, portions of these attached parts being shown mainly in elevation, while the parts essential to an understanding of the invention are illustrated in section. Fig. 2 is an end elevation of the attached wheel and shaft looking along the latter. Fig. 3 is a side elevation of the end portion of the shaft, certain parts shown in Fig. 1 being omitted and part being in section. Fig. 4 is an end elevation of the shaft, a portion likewise being shown in section. Fig. 5 is an axial section of the hub of the wheel shown in Figs. 1 and 2, that portion only, however, being shown which is more immediately concerned in the application of the invention. Fig. 6 is an end elevation of the part shown in Fig. 5. Fig. 7 is a side view of a locking-piece or element embraced in the invention. Figs. 8, 9, and 10 are side, top, and end views, respectively, of an element shown in the particular application of the invention illustrated in the preceding figures. Fig. 11 is a view on a smaller scale and mostly sectional illustrating a mode of applying the invention in which the element shown in Figs. 1 to 10, inclusive is not used.

Similar characters of reference designate corresponding parts in all the figures.

The fastening device of this invention may be said to comprise cylindrical and conical surfaces, so combined with relation to each other and to their respective contacting surfaces that the reliability of the fastening device, considered as a whole, is independent of the particular position, within limits, in which the two parts of a two-part fastening are placed for the purpose of being secured one to the other. The conical surface coöperating with its opposed surface accomplishes a wedging or binding of the parts in place, while the cylindrical surface is so disposed with relation to the other surfaces as to render an effective binding action to a considerable degree independent of the relative position of the parts one to the other.

Entering upon a more detailed description of the embodiment of the invention illustrated, S Figs. 1 to 4, and $S^{10}$ Fig. 11 designates a shaft, and W the hub of a wheel fastened together by means of a device embodying this invention. These particular parts, it will be understood, are chosen merely for illustrative purposes.

R designates a locking-piece or element whose surfaces constitute, in the preferred form of the invention, the operative conical and cylindrical surfaces for effecting the locking of the parts. These surfaces are combined in such a way upon the locking piece that while the conical surface coöperates with proper opposed surfaces to effect the locking of the parts, by reason of a longitudinal movement given to the locking piece, yet the reaction surfaces which receive the lateral thrust due to the slight lateral movement of the locking piece when urged longitudinally to position are cylindrical ones.

The cavity for the reception of the locking piece is sunk axially, partly in the shaft S and partly in the hub W, and the locking piece therefore performs the further function of a driving key. The opening in which the locking piece is located is a straight opening—that is it may be a bored or drilled opening—and furthermore it is not material whether the locking piece fits snugly therein or not. The opening in the arm for the reception of the shaft need not necessarily be of a diameter requisite to form a snug fit of the shaft therein, as the effect of the locking piece when moved to its locking position is to wedge the parts firmly together irrespective of the looseness of the parts.

The locking piece embodying the cylindrical and conical surfaces before mentioned is conveniently made in the form of a screw, and in the construction here shown the locking piece is in such form. The diameter of this screw or locking piece and the coarseness and pitch of its thread or threads will be such as to insure ample strength to withstand the strain to which the parts may be subjected. The thread section may be varied from that shown, although for satisfactorily applying the invention I deem it advisable that there should be at the top and bottom of the thread, surfaces of substantial length measured axially of the screw. The screw may also be single, double or triple, etc., threaded.

For the purpose of effecting a binding or wedging action as the result of turning the screw home with the object of taking up any slackness or looseness that may exist in the joint between the parts to be connected, and also for holding the screw or locking-piece from jarring or working out, one or more of the coöperating surfaces of the fastening device is made slightly tapering or inclined relatively to the axial line of the locking-piece.

In the present instance the top surface of the thread upon the locking piece R constitutes a portion of the surface of a cylinder; that is, the stock upon which the thread is formed is cylindrical from end to end, for a purpose that will be referred to later. The core or body of the locking-piece or screw, however, tapers from one end to the other, the thread in this instance being deeper at the entering end of the screw than at the opposite end.

It is evident, from the foregoing description, that if the thread sections upon one of the parts to be connected are made of a depth not less than the maximum depth of the thread upon the locking-piece R, that these thread sections will bed against or contact with the surface at the bottom of the thread on the locking-piece before the bottoms of said thread sections contact. Hence, owing to the tapering body of the locking-piece, lengthwise movement of this piece will be accompanied by its slight lateral movement. These mentioned thread sections are, in the present instance, presented by the part opposite the hub W. These thread sections may be made directly in the shaft S as shown in Fig. 11 or in an element P, here shown to be curved at its lower edge and set in a corresponding slot in the shaft. This form given to the element P will permit its adjustment to conform to the angle determined by the inclination of the core of the locking-piece. Organized and arranged in this manner, a better and more complete contact of the thread sections along the length of the taper-core of the locking-piece is secured than if said sections were made integrally with the shaft. However, the presence of this separate piece is not essential to the scope of the invention, as the thread may be made in the shaft itself as stated before and, as shown in Fig. 11, where $S^{10}$ is the shaft, W the wheel-hub and R the locking-piece. The thrust arising from the lateral movement of the locking-piece R is taken by the opposite part consisting of the hub W, and preferably the surfaces between which this thrust or pressure is exerted are cylindrical, so as not to render the reliability of the fastening device dependent upon an exact position of the wheel hub with reference to the shaft.

As before stated, the locking-piece R is of substantially uniform diameter from end to end of the thread as measured across the top of the thread. To render the top surface of the thread on the locking piece, the operative one for the purpose set forth in the last paragraph, the depth of the thread sections in the wheel hub W in the present embodiment should be somewhat less than the minimum depth of the thread upon the locking-piece. It is evident, therefore, that the top of the thread upon the latter will bed against or contact with the surface at the bottom of the thread sections in the wheel hub before the tops of these thread sections contact. Hence the operative contact—and by this expression I mean, the contact to which the principle of the invention may be referred—is in the present embodiment upon one side, cylinder to cylinder, and upon the other a wedging or transverse action is present. It is not important therefore that in assembling and reassembling machine parts that they must always be located in identically the same relative position to render the fastening by this device effective, although by the use of this invention the parts may be secured one to the other with great precision. This permissible variation in position with attendant uniform reliability in attachment is especially desirable in the fixing of small machine parts together.

Having described my invention, what I claim is—

1. A fastening device comprising a locking-piece or element having alternately disposed cylindrical and conical or tapering surfaces extending from end to end of the element.

2. A fastening device comprising a locking-piece or element provided with a screw-thread of substantially uniform width at the top and uniform width at the bottom and the depth of which thread is different adjacent to the two ends of the said element, said screw thread extending from end to end of the element.

3. A fastening device comprising a locking-piece or element provided with a screw-thread of substantially uniform width at the top and uniform width at the bottom, the variation in the thickness or diameter of said element adjacent to the ends of the thread being different when measured at the base or bottom of the thread than when measured at the top thereof, and the screw thread extending from end to end of the element.

4. A fastening device comprising a locking-piece or element provided with a screw-thread extending from end to end of the element, said element having a substantially uniform thickness or diameter at the top of said thread and a varying thickness or diameter at the bottom or base of said thread, and the width at the top of the thread being substantially uniform and the width at the bottom of the thread being likewise substantially uniform.

5. The combination, with parts to be fastened together, of a locking piece or element having alternately disposed cylindrical and conical or tapering surfaces, the cylindrical surface being in operative contact with one of said parts, and the conical surface in similar contact with another of said parts.

6. The combination with parts to be fastened together, of a locking-piece or element comprising a screw having a varying depth of thread, the upper surface of said thread being of substantially uniform width and constituting the operative surface with respect to one of said parts and the surface at the base or bottom of said thread being likewise of substantially uniform width and constituting the operative surface with respect to another of said parts.

7. The combination with parts to be fastened together, of a locking-piece or element comprising a screw having a substantially uniform thickness or diameter from end to end when measured at the top of the screw-thread and a varying thickness or diameter when measured at the base or bottom of said thread, the upper surface of said thread being of substantially uniform width and constituting the operative surface with respect to one of said parts and the surface at the base or bottom of said thread being likewise of substantially uniform width and constituting the operative surface with respect to another of said parts.

8. The combination with parts to be fastened together, of a locking-piece or element comprising a screw having a substantially uniform thickness or diameter from end to end at the top of the screw-thread and a varying thickness or diameter at the base or bottom of said thread, one of said parts presenting engaging thread sections of a depth not less than the maximum depth of the thread upon the said locking-piece and another of said parts engaging thread sections of a somewhat less depth than the minimum depth of the thread upon the locking-piece.

9. The combination with parts to be fastened together, of a locking-piece comprising a screw, and a separate segmental shaped element located in a corresponding recess in one of said parts and provided along its edge with engaging thread sections.

10. The combination with parts to be fastened together, of a locking-piece or element comprising a screw having a substantially uniform thickness or diameter from end to end at the top of the screw-thread and a varying thickness or diameter at the base or bottom of said thread, and a separate element movable in one of said parts to conform to the angle determined by the varying diameter of the locking-piece.

11. The combination with parts to be fastened together, of a locking-piece or element comprising a screw having a substantially uniform thickness or diameter from end to end when measured at the top of the screw-thread and a varying thickness or diameter when measured at the base or bottom of said thread, and a separate element having a curved seat in one of said parts whereby it may adjust itself to the angle determined by the varying diameter of the locking-piece, and provided with engaging thread sections.

12. The combination, with the hub of a wheel and a shaft, of a fastening device for securing the one to the other comprising a locking-piece consisting of a screw having a substantially uniform thickness or diameter from end to end at the top of the screw-thread and a varying thickness or diameter at the base or bottom of said thread and a separate element situated in a curved slot in said shaft and provided with engaging thread sections.

13. A fastening device comprising, a locking piece or element provided with a screw thread, the depth of each adjacent convolution being greater toward the end of the element and throughout the length thereof than the depths of the threads nearer the head of the locking piece.

14. A fastening device comprising an elongated locking piece or element provided with a screw thread, the depth of each adjacent convolution toward the end of the element being greater throughout the length thereof.

15. A fastening device comprising an elongated locking piece or element provided with a series of connected grooves or ways, the depth of each succeeding groove or way being increased throughout the length thereof.

16. A fastening device comprising a locking piece or element having an elongated body provided with a continuous groove which, as it increases in length, also increases in depth throughout the length thereof.

17. A fastening device comprising an elongated core having threads, each convolution of which is of varying diameter throughout the length of the core.

18. The combination in a fastening device, of the parts to be fastened together, a fastening member embodying a screw having its core and the summit of its thread disposed upon non-parallel lines, a thrust face on one of the said parts for the engagement of one of these, the other of said parts having a concave bearing and a member seated in said concave bearing and having a thrust face for the engagement of the other portion of said fastening member.

19. The combination in a fastening device, of the parts to be fastened, a fastening member embodying a screw having its core and the summit of its thread disposed upon non-parallel lines throughout, a fixed thrust face on one of the said parts for the engagement of one of these, and an automatically adjustable thrust face carried by the other of the parts for the engagement of the other portion of the fastening member.

20. In a two-part fastening device, the combination with a pair of parts to be fastened together, one of these having an opening for embracing the other, and a fastening piece having a cylindrical and a conical bearing surface one superimposed on the other, one of said parts having bearings for the conical portion and clearance for the cylindrical portion, and the other of said parts having bearings for the cylindrical portion and clearance for the conical portion.

21. In a two-part fastening device, the combination with a pair of members located one within the other, and a locking piece having conically disposed thrust faces for engaging one and superimposed cylindrically disposed thrust faces for engaging the other of these.

22. The combination with two parts to be locked together, of a locking screw having a conical core, and a uniform cylindrical surface on the perimeter of its thread superimposed on said core.

FRANCIS H. RICHARDS.

Witnesses:
  FRED. J. DOLE,
  C. E. VOSS.